Patented Sept. 14, 1948

2,449,163

UNITED STATES PATENT OFFICE 2,449,163

PROCESS FOR THE PREPARATION OF ALPHA, ALPHA-DIALKYL BETA-CHLOROPROPIONIC ACIDS

Thomas Aven Ford, Wilmington, Del., assignor to E. I. du Pont de Nemours & Company, Wilmington, Del., a corporation of Delaware No Drawing. Application August 12, 1946, Serial No. 687,961

7 Claims. (Cl. 260—539)

This invention relates to a process for the production of alpha,alpha-disubstituted-beta-halogenopropionic acids and, more particularly, of alpha,alpha-dimethyl-beta-chloropropionic acid.

In U. S. Patent 1,924,762 a process is disclosed for the preparation of carboxylic acids by reacting an olefin hydrocarbon with carbon monoxide and steam, desirably with an inorganic acid, over certain catalysts. It is indicated that these acids may be furnished by, among other sources, volatile organic halogen compounds by hydrolysis under the reaction conditions. German Patent 568,129 discloses that vinyl chloride reacts with carbon monoxide at elevated pressure in the presence of aluminum chloride as catalyst to give a product apparently polymeric acrylyl chloride. U. S. Patent 1,993,555 discloses that aliphatic halogenated hydrocarbons react with steam and carbon monoxide to give non-halogenated carboxylic acids having a greater number of carbons in the molecule.

This invention has as an object the preparation of monomeric halogenated carboxylic acids from certain halogenated olefins. Another object is the preparation of alpha,alpha-disubstituted-beta-halogenopropionic acids. Still a further object is to provide a new one-step process for the preparation of alpha,alpha-dimethyl-beta-chloropropionic acid from relatively cheap raw materials. Other objects will appear hereinafter.

These objects are accomplished by the following invention wherein carbon monoxide is reacted under pressure and in the presence of a hydrated strong acid catalyst with an organic ethylenic compound in which the two remaining valences of one of the ethylenic carbons are respectively attached to a halogenomethyl group and a monovalent hydrocarbon radical, the two remaining valences of the other ethylenic carbon atom being satisfied by hydrogen, or monovalent hydrocarbon radicals.

The ethylenic compounds reacted by the process of this invention are of the formula

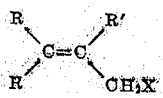

wherein X is halogen, i. e., fluorine, chlorine, bromine, or iodine, R is hydrogen or a monovalent hydrocarbon radical, and R' is a monovalent hydrocarbon radical.

In a particularly preferred practice of the invention, methallyl chloride is reacted with carbon monoxide in the presence of hydrated boron trifluoride at a temperature within the range of 60 to 150° C. under a pressure of 200 to 1000 atm.

The following example, in which parts are given by weight unless otherwise specified, illustrates the invention.

Example I

A silver-lined, high-pressure reactor equipped with a shaker mechanism was charged to 25% of its volume with 103.8 parts of boron trifluoride dihydrate ($BF_3 \cdot 2H_2O$). The vessel was closed, connected to a source of carbon monoxide and pressured to 500 atm. with this gas. Agitation was started and the temperature was raised to 100° C. with a resultant pressure rise to 570 atm. With the temperature maintained at 100–102° C. throughout the reaction, methallyl chloride was then injected at about 40 parts per hour over a period of 1.5 hours. The total amount of methallyl chloride so injected was about 59 parts by weight. By this time, the pressure had reached 750 atm. During the next two hours in which the reaction was continued without further addition of methallyl chloride the pressure dropped to 720 atm. where it remained constant for the next 6.5 hours, indicating that the reaction required at most 3.5 hours, although the total reaction time used amounted to approximately ten hours. The reactor was cooled to 25° C., excess carbon monoxide was bled off, and the liquid reaction products were discharged, diluted with water and steam distilled. The residue contained a dark oil amounting to 4.5 parts. The distillate contained 3 parts of an alkali insoluble oil and 74 parts of a steam-volatile acid, moderately soluble in water, which was isolated by ether extraction. About 96% of this acid was alpha,alpha-dimethyl-beta-chloropropionic acid, a colorless crystalline solid boiling in the range of 123–125° C./30 mm. This fraction had a very sharp freezing point of 44° C. The neutral equivalent was found to be 137.0 as compared to the calculated value of $C_5H_9O_2Cl$ of 136.6.

The process of this invention is operable only with olefinic compounds wherein the R' attached to the ethylenic carbon bearing the —$CH_2X$ group is hydrocarbon since those olefinic compounds having hydrogen on the carbon bearing the —$CH_2X$ group do not seem to react in the same way. Thus when the procedure of the above example was applied to allyl chloride (in place of the methallyl chloride), no trace of alpha-methyl-beta-chloropropionic acid was found whether the process was operated at 75° C.

or 100° C. Attempts to apply the process of this invention to vinyl chloride, trichloroethylene, and tetrachloroethylene were unsuccessful.

Although the invention has been described with particular reference to methallyl chloride (3-chloro-2-methylpropene), it is generally applicable to any ethylenic compound as above described. Particularly preferred are those of the formula

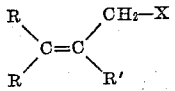

wherein X is a halogen, R is hydrogen or a monovalent hydrocarbon radical of 1 to 6 carbon atoms, preferably phenyl or alkyl, and R' is a monovalent hydrocarbon radical of 1 to 6 carbon atoms, preferably phenyl or alkyl. Those compounds in which X is chlorine or bromine, i. e., a halogen from the 2d to 3d periods of the periodic system are preferred because these are the most readily available and economical to use. Specific examples include 3-bromo-2-methylpropene, 3-iodo-2-methylpropene, 1-chloro-2-methyl-2-butene, 1-bromo-2-methyl-2-butene, 1-bromo-2,6-dimethyl-2-heptene, and 1-bromo-2,3-diphenyl-2-butene.

The molar ratio of the ethylenic compounds of this invention to the carbon monoxide may vary within the range of from 1:1 to 1:20 or more. In general, however, it is preferable to use a large excess of carbon monoxide and molar ratios of 1:5 to 1:10 have been found to be especially desirable.

Strong acid catalysts, in general, are suitable for the operation of this invention although the acid-reacting hydrates, for example, such as $BF_3.(H_2O)_x$, $H_2SO_4.(H_2O)_x$, and $H_3PO_4.(H_2O)_x$ and the like are especially desirable. The subscript $x$ in the foregoing formulae may vary from 1 to 5 or more, but is preferably 2 to 3. Preferred catalysts from this list are the boron fluoride hydrates $[BF_3.(H_2O)_x]$ where $x$ is 1 to 3.

The quantity of acid produced is limited by the amount of water available and it is hence desirable to use the hydrated strong acid catalyst in sufficient proportion to provide from about one-half to one mole of water per mole of carbon monoxide in the reactor. Additional water may be added during the reaction if desired to maintain the catalyst:water ratio within the preferred range.

The temperatures employed in the process of this invention may vary from about 50° to 200° C., although preferably from about 60° C. to 150° C.

Although the total pressure used in the process of this invention may be as low as about 1 atm., higher pressures give a more favorable reaction rate, and in fact superatmospheric pressures of 1000 atm. or higher may be employed, the upper limit being governed only by the strength of the equipment available. In general, it is preferable to operate within the range of from about 200 atm. to about 1000 atm.

The process may be operated as a batch, semibatch or continuous process. The reactants may be introduced separately as in the example, or they may be premixed in the desired proportions and then charged into the reactor. The reactants are maintained in mutual contact by agitation as illustrated in the example, by turbulent flow, or by efficient bubbling of the gases through the liquid phase or the like. Optimum results are usually obtained when the ethylenic compounds of the invention are injected into a pre-heated mixture of carbon monoxide, water and catalyst.

The carbon monoxide used may be obtained from various commercial sources, e. g., from water gas, producer gas, coke-oven gas or the like. It is preferable, however, to employ reaction ingredients of high purity, with objectionable constituents removed from such commercial gases.

The products obtained by the process of this invention, the beta-halogenopropionic acids having two monovalent hydrocarbon substituents on the alpha carbon and two hydrogens on the beta carbon, are useful for various commercial uses. They are especially useful in the preparation of amino acids for pharmaceuticals, foodstuffs, and for polyamide intermediates.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for the preparation of alpha,alpha-dimethyl-beta-chloropropionic acid which comprises bringing a reaction mixture containing methallyl chloride as essentially the only olefinic component under a carbon monoxide pressure of 200 to 1000 atmospheres in contact, at 60–150° C., with boron trifluoride dihydrate.

2. Process for the preparation of alpha,alpha-dimethyl-beta-chloropropionic acid which comprises bringing a reaction mixture containing methallyl chloride as essentially the only olefinic component under a carbon monoxide pressure of 200 to 1000 atmospheres in contact, at 60–150° C., with a hydrated strong acid catalyst.

3. Process which comprises bringing a reaction mixture containing as essentially the sole olefinic component, a methallyl halide wherein the halogen is from the 2d to 3d periods of the periodic system under a carbon monoxide pressure of 200 to 1000 atmospheres in contact, at 60–150° C., with boron trifluoride dihydrate.

4. Process which comprises bringing a reaction mixture containing as essentially the sole olefinic component, a methallyl halide wherein the halogen is from the 2d to 3d periods of the periodic system under a carbon monoxide pressure of 200 to 1000 atmospheres in contact, at 60–150° C., with a hydrated strong acid catalyst.

5. Process which comprises bringing a reaction mixture containing as essentially the sole olefinic component, a methallyl halide under a carbon monoxide pressure of 200 to 1000 atmospheres in contact, at 60–150° C., with a hydrated strong acid catalyst.

6. Process for the preparation of beta-halogenopropionic acids which comprises bringing, as the sole olefinic reactant, an olefinic compound of the formula $$RCH=C(CH_3)CH_2X$$

wherein X is a halogen selected from the 2d and 3d periods of the periodic table and R is selected from the class consisting of hydrogen and alkyls of one to six carbons, under a carbon monoxide pressure of at least 200 atmospheres in contact, at 50–200° C., with a hydrated strong acid catalyst.

7. Process for the preparation of beta-halogenopropionic acids having at least one alkyl group and that of not more than six carbons, on the alpha carbon which comprises bringing, as the sole olefinic reactant, an olefinic compound of the formula

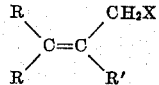

wherein X is halogen, R' is a monovalent hydrocarbon radical of one to six carbons, and R is selected from the class consisting of hydrogen and monovalent hydrocarbon radicals of one to six carbons in contact at 50–200° C. under a carbon monoxide pressure of at least 200 atmospheres, with a hydrated strong acid.

THOMAS AVEN FORD.

REFERENCES CITED

The following references are of record in the file of this patent:

UNITED STATES PATENTS

| Number | Name | Date |
|---|---|---|
| 1,924,765 | Larson | Aug. 29, 1933 |
| 1,924,762 | Woodhouse | Aug. 29, 1933 |
| 2,020,689 | Larson | Nov. 12, 1935 |
| 2,025,677 | Woodhouse | Dec. 24, 1935 |
| 2,033,161 | Vail | Mar. 10, 1936 |
| 2,135,459 | Loder | Nov. 1, 1938 |
| 2,217,650 | Loder | Oct. 8, 1942 |

Certificate of Correction

Patent No. 2,449,163. September 14, 1948.

THOMAS AVEN FORD

It is hereby certified that errors appear in the above numbered patent requiring correction as follows:

In the heading to the printed specification, line 8, for "Application August 12, 1946" read *Application August 2, 1946*; column 2, line 44, for "value of" read *value for*; column 3, line 75, for "usuall" read *usually*; column 5, line 9, claim 7, before "monovalent" insert *saturated*;

and that the said Letters Patent should be read with these corrections therein that the same may conform to the record of the case in the Patent Office.

Signed and sealed this 15th day of March, A. D. 1949.

[SEAL]

THOMAS F. MURPHY,
*Assistant Commissioner of Patents.*